United States Patent [19]

Liner

[11] Patent Number: 5,046,704

[45] Date of Patent: Sep. 10, 1991

[54] METHOD AND APPARATUS IMPROVEMENTS IN OYSTER AND SHRIMP WINCHES

[76] Inventor: Christopher A. Liner, Box 13-D, Theriot, La. 70397

[21] Appl. No.: 295,553

[22] Filed: Jan. 11, 1989

[51] Int. Cl.[5] .......................... F16D 19/00; B66D 1/14

[52] U.S. Cl. ................................ 254/348; 192/93 A; 254/317; 254/321; 254/376

[58] Field of Search ............... 254/348, 346, 350, 376, 254/317, 321; 384/369, 420, 912; 192/66, 93 A, 113 B

[56] References Cited

U.S. PATENT DOCUMENTS

| | | | |
|---|---|---|---|
| 150,765 | 5/1874 | Knowlson | 254/348 |
| 697,151 | 4/1902 | Lantz | 254/321 |
| 1,625,769 | 4/1927 | Ersted | 192/93 A |
| 1,627,858 | 5/1927 | Morgal | 192/93 A |
| 4,378,221 | 3/1983 | Huff | 192/93 A |
| 4,533,262 | 8/1985 | Pedersen | 384/420 |

*Primary Examiner*—Katherine A. Matecki

[57] ABSTRACT

Improvements in marine winching apparatus and method for use in conjunction with oyster dredging, shrimping, and similar activities in the fishing industry with regard to two, four, and five drum winches as used in the fishing and marine industries. The improvements relate to the overall compact compartmentation and configuration of the device, as well as new innovative improvements in the clutch mechanism, the split collar, wear plates, cleaves, shaft, and other aspects of the mechanism of the winch, which will vary depending upon the contemplated use. An exemplary embodiment and design for a winch specifically designed for oyster dredging, in which the winch includes a new and unique configuration, including the incorporation of a "dredge post" implemented in the construction of the winch for safer and more efficient dredging of oysters, is disclosed. Additionally, the present invention also contemplates an exemplary embodiment for a four and five drum winch specifically designed for commercial trawling such as that associated with shrimping and the like, which reduces the need for extra winches for monitoring test lines, nets and the like.

12 Claims, 8 Drawing Sheets

METHOD AND APPARATUS IMPROVEMENTS IN OYSTER AND SHRIMP WINCHES

BACKGROUND of INVENTION

1. Field of Invention

The present invention relates to winches, and in particular to improvements in commercial fishing and marine winches, as well as a new and unique apparatus and method specifically designed for use in conjunction with oyster dredging, shrimping, and similar activities in the fishing industry.

The present invention discloses various improvements with regard to two, four, and five drum winches as used in the fishing and marine industries. The improvements relate to the overall compact compartmentation and configuration of the device, as well as new innovative improvements in the clutch mechanism, the split collar, wear plates, cleaves, shaft, and other aspects of the mechanism of the winch, which will vary depending upon the contemplated use.

Further, the present invention contemplates an improvement in winches, which provides for a longer wearing, self lubricating winching system which will last many times longer than the conventional winches taught in the prior art, as well as providing a winching apparatus which requires relatively little maintenance.

The present invention teaches an exemplary embodiment and design for a winch specifically designed for oyster dredging, in which the winch includes a new and unique configuration, including the incorporation of a "dredge post" implemented in the construction of the winch for safer and more efficient dredging of oysters.

Additionally, the present invention also contemplates an exemplary embodiment for a five drum winch specifically designed for commercial trawling such as that associated with shrimping and the like, which reduces the need for extra winches for monitoring test lines, nets and the like.

2. Prior Art & General Background

As may be seen by a review of the prior art, there has been little innovation with regard to winches as used in the fishing and maritime industry for many decades. Most patents cited in the prior art teach rather simplistic mechanical devices which retain and dispense two to four fishing lines, chains, ropes, or the like.

None of the prior art disclosures suggests devices which are particularly adapted to operate under the severe corrosive conditions of the sea, or operate for extended periods of time with relatively little maintenance and repair. Further, none of the devices appear to be particularly suitable for operating oyster dredges, which at present requires a rather precarious and dangerous system of pulleys and cable supports to direct the dredge to its desired position relative the vessel.

With regard to the utilization of marine winches in conjunction with shrimping, the shrimpers typically relied upon a multiplicity of one, two or four drum winches for pulling the main nets, as well as separate winches for pulling the test nets. The multiplicity of winches represented a rather significant investment in very costly equipment, with a proportional increase in preventative maintenance and repair.

The typical medium size shrimp trawling vessel in the Gulf of Mexico has the capability of pulling at least five nets: two outer, or "butterfly" nets (one on each side of the vessel), an inner "main" net, and two test nets, or "trawls". The five nets require a number of lines for control and maneuvering; these lines in turn require a multiplicity of individual winches to control each line.

Because the many separate winches of the prior art were apart from one another, it was difficult for the fisherman to single handedly operate the equipment; further, the separation of the winches increased the likelihood of the lines becoming tangled. Applicant knows of no prior art teaching a single, compact five drum winch designed for utilization with the five nets of the typical medium size trawling vessel.

With regard to oyster dredging, the commercial fisherman has not had a satisfactory system to lower and raise the oyster dredge. The equipment on the market today needs constant maintenance, and often nonetheless fails. Further, the configuration of the chain guides is dangerous and inefficient, requiring greater pull than is necessary due to the many angles traversed by the chain line from the winch to the dredge.

While conventional winches have been used in the past, there was great room for improvement. The "dredge post" of the prior art comprised a vertical wooden or metal member affixed to the deck of the vessel and incorporating pulley means of guiding a flexible member such as a chain, cable or the like which retained the dredge. This configuration often proved dangerous as the "dredge post" would ultimately catastrophically fail, pulling up a part of the deck in the process and often causing injury to any fishermen unfortunate enough to be in the path of the post or line.

A list of prior patents which may be of interest are listed below:

| U.S. Pat. No. | Patentee(s) | Issue Date |
|---|---|---|
| 122,843 | Mayhew | 1/16/1872 |
| 1,324,703 | Trew | 12/9/1919 |
| 2,010,280 | Thiman | 9/06/1935 |
| 2,157,153 | H. J. Troche | 08/14/1939 |
| 2,464,245 | Longren | 3/15/1949 |
| 2,555,676 | Clark | 6/5/1951 |
| 3,119,601 | Blount | 1/28/1964 |
| 3,161,980 | James | 12/22/1964 |

As may be seen by a review of the above patents, the prior art does not teach nor contemplate a heavy duty marine winch designed for extended periods of activity without the traditional maintenance required of conventional winches.

Similarly, the prior art does not contemplate a marine winch designed specifically for use in conjunction with oyster dredges, incorporating a "dredge post", nor does it teach an alternative embodiment specifically designed for use in conjunction with shrimping vessels wherein a multiplicity of drums are provided eliminating the need for more than one winching station on the vessel.

3. General, Summary Discussion of the Invention

The present invention overcomes the prior art problems by providing a heavy duty marine winch designed for the specialized operations associated with the oyster and shrimp harvesting industry, preferably providing a heavy duty, compact, well designed system comprising high quality components and utilizing sophisticated, innovative techniques of construction and operation.

The present invention teaches a marine winch of high grade materials including stainless steel, cast steel, bronze, and high tensile alloys configured into an improved, compact component package having a relatively small footprint while providing superior strength and durability over conventional, prior art winches.

Innovations of the present invention include a new and unique way of circulating lubricants to the axle, thereby eliminating the necessity of constantly greasing the winch. This is done through a new wear plate design, which has an unconventional but effective square configuration, including "grease grooves" which circulate the lubricant from the outer portion of the winch to the axle area with each revolution of the plates.

The present invention teaches a device utilizing high quality components heretofore not used in conjunction with commercial fishing winches. Among these components are "Inkalloy" springs and high stress bearings.

Also disclosed is a new and unique apparatus configuration contemplating the virtual wear of the material of the component parts and compensating for that wear potential by incorporating materials of different "hardness" or wear capability. For example, the wear plates of the present invention are taught in the exemplary embodiment as being constructed of 660 bronze, a material softer than the cast iron components, juxtaposed to the plates, so as not to wear them, yet having five times the strength of brass, which was used in prior art "improved" wear plates.

Other innovations of the present invention over the prior art will become apparent upon review of the specification.

It is thus an object of the present invention to provide a winch system to be used in the commercial fishing industry having increased wear capability over the prior art.

It is a further object of the present invention to provide a winch system specifically designed for utilization in a salt water environment yet requiring less maintenance and repair than the prior art.

It is a further object of the present invention to provide a winch system specifically designed for oyster dredging, incorporating a built-in "dredge post".

It is still a further object of the present invention to provide a winch system designed for utilization in conjunction with the multiple net shrimp trawling system as practiced in the Gulf of Mexico.

It is a further object of the present invention to provide a winch system including a plurality of drums and having paired means of control, with the system being incorporated into a compact configuration easily controlled by one person.

It is a further object of the present invention to provide a method of winching, utilizing an apparatus compact in design and including a multitude of drums.

It is a still further object of the present invention to provide a winch system comprised of high grade components and alloys, designed for reduced maintenance and repair.

It is a further object of the present invention to provide a winch apparatus and system incorporating a new and unique method of circulating lubricants such as axle grease and the like, utilizing "grease grooves" incorporated into specially configured wear plates.

Lastly, it is an object of the present invention to provide a winch apparatus having alloys of different hardness characteristics specifically utilized for maximum overall wear of the system via the incorporation of slightly softer, replaceable, sacrificial parts.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION of the PREFERRED, EXEMPLARY EMBODIMENTS

Figure 1:
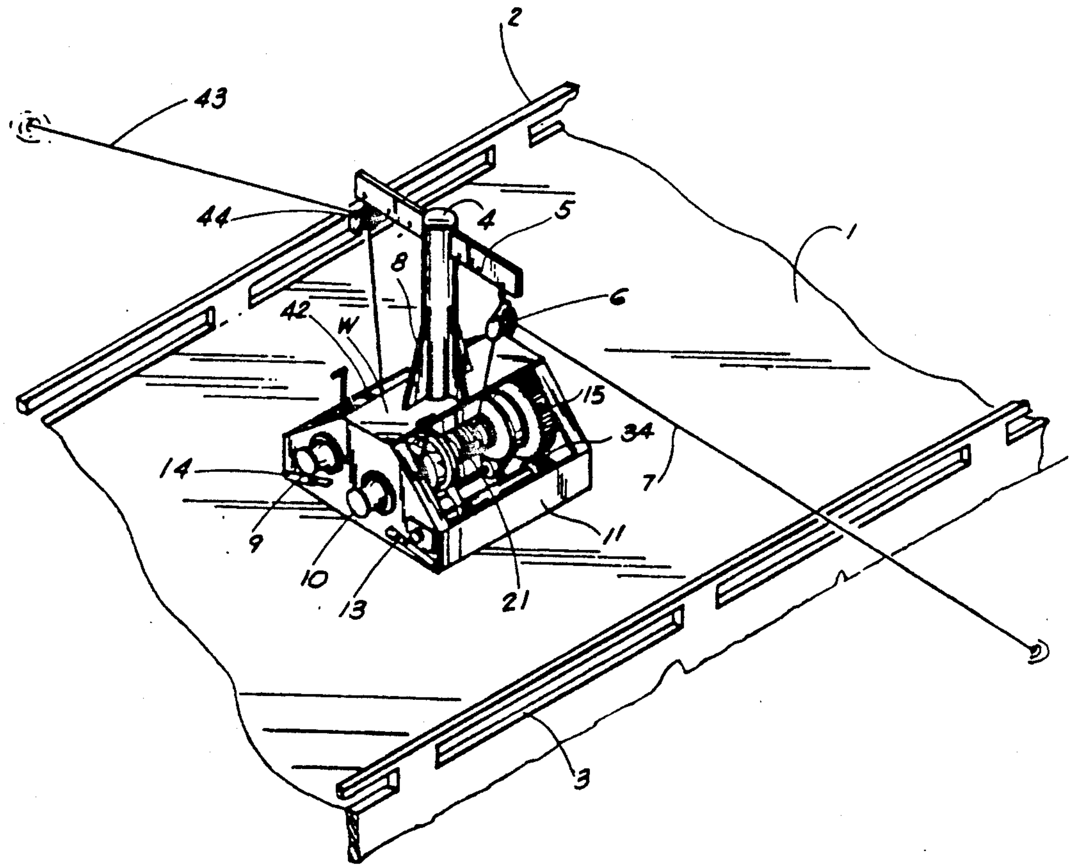
FIG. 1 is a side, perspective view of the oyster dredge embodiment of the present invention illustrating the placement of the device on an oyster dredge vessel.
Figure 2:
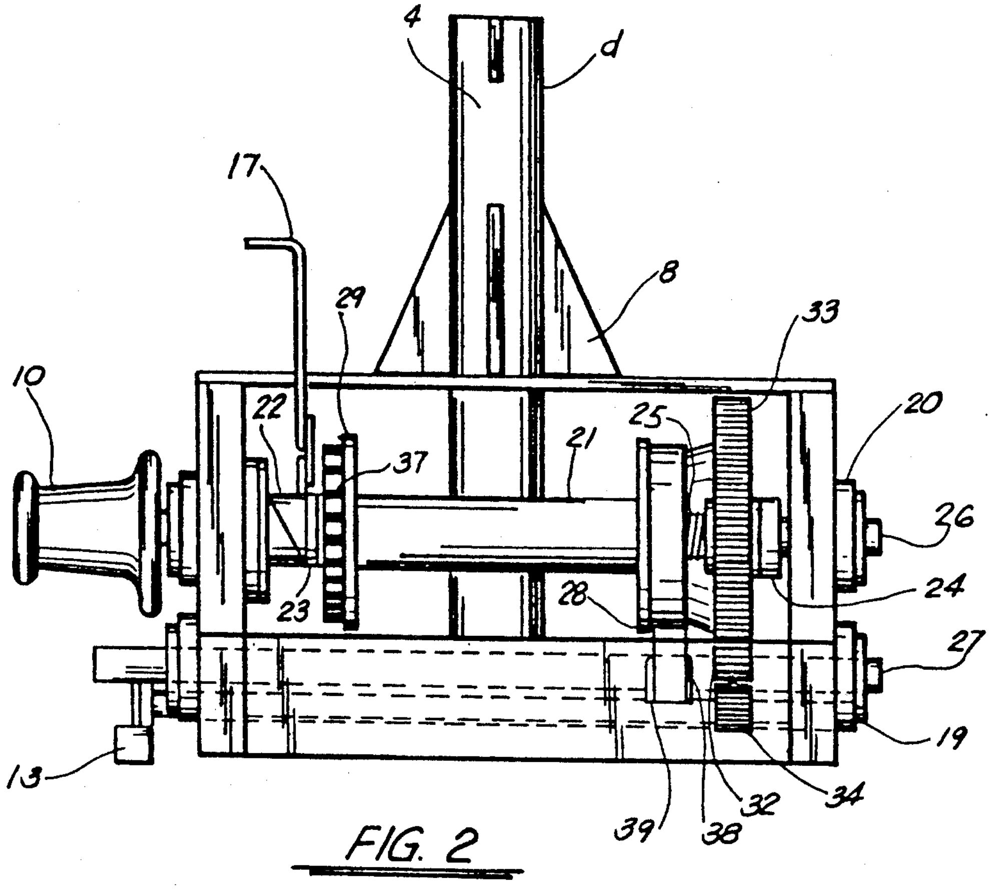
FIG. 2 is a frontal view of the oyster dredge embodiment of the present invention illustrating the incorporation of the "dredge post", with some of the interior structure shown in phantom line.
Figure 3:
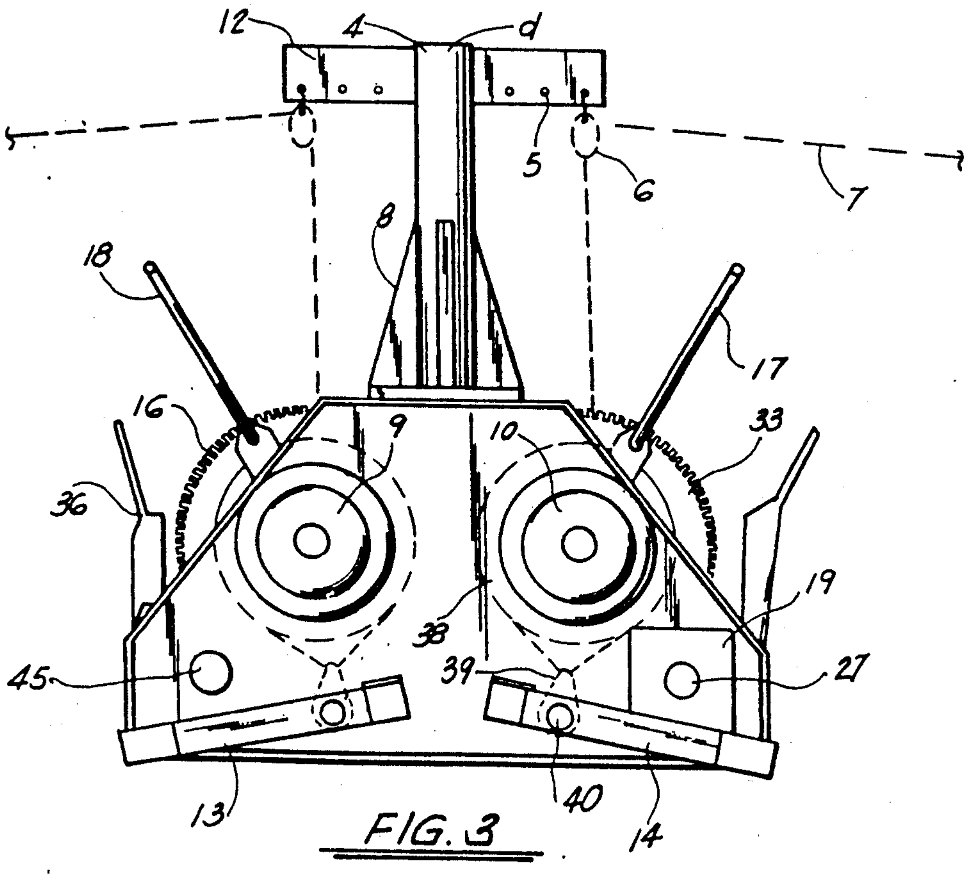
FIG. 3 is a side view of the oyster dredge embodiment of the present invention illustrating in phantom the passage of the dredge line(s) from the drum(s) through the pulley, on to the oyster dredge(s).

As may be seen in FIG. 1, the two drum winch W embodiment of the present invention is mounted to the deck 1 of a small to medium size vessel intended for dredging. This two drum embodiment is specifically designed for use in conjunction with the dredging of oysters, clams, and the like. As illustrated in FIGS. 2 & 3, the device of the present invention includes several new and unique innovations with regard to marine winches. The chassis 11 of the invention is comprised of cast steel, stainless steel or the like, providing support for the various components of the apparatus and is configured to encase the winch system itself, protecting it from the elements as well as isolating the moving parts from the user. Weldingly affixed to the chassis 11 of the present embodiment is dredge post d; it is this innovation which makes this embodiment particularly suitable for dredging operations.

The dredge post d comprises a rectilinear or cylindrical support member affixed in perpendicular fashion to the base center of chassis 11, and includes structural reinforcement in the form of tapered support members 8 affixed to the upper planer horizontal support area of chassis 11.

Dredge post d includes two block supports 12 weldingly affixed at the end of dredge post d distal chassis 11. Block supports 12 project in perpendicular fashion from the sides of dredge post d, and include tap holes 5 for supporting block 6.

The exemplary oyster dredge winch of the present embodiment comprises two drum combinations; one for manipulating an oyster dredge on the aft side of the vessel, and the other for controlling starboard dredge.

During dredging operations, the oyster dredge is dragged along the seabed by the vessel, collecting oysters in its path. The aft oyster dredge, is pulled by the vessel via cable 7, which passes through block 6 to the aft drum 21 of the winch W. Aft drum 21 is supported by upper shaft 26, which is situated juxtaposed the vertical walls of chassis 11, affixed to said chassis via shaft collar 20. An identical system is provided for the starboard side of the vessel whereby starboard cable 43, block 44 and drum 42 are used.

In order to facilitate rotation and control of the drum, the present invention utilizes a dual clutch friction engagement system incorporated with a perpetual drive system, and including a gear locking system.

As may be seen in FIGS. 2, 3, 4 and 9A & B of the drawings, the engagement clutch 22 of the present invention has the general configuration known in the industry as a jaw clutch and is used for engaging the winch to the main clutch. This "engagement" clutch comprises a tubular cylindrical member with a solid cleave 47 at its base, said cleave having a forty-five degree separation 48 which forces the drum 21 to slide in the direction of drive gear 33 when engagement clutch handle 17 is pulled. Prior art winches of similar size typically utilized a $\frac{1}{4}$ inch duplex clutch, while the present invention has a mechanism comprising $\frac{7}{8}$th inches, thereby providing increased strength and wear ability. Handle 17 is connected to clutch 22 via a handle mount, which includes mounting top holes.

When handle 17 is pulled, clutch 22 separates, forcing drum 21 via wear plate 23 to slide along shaft 26, engaging friction cone 32 with drum well 28. Drum well 28 is configured to communicate with friction cone 32, having an surface inverted to that of friction cone 32 to provide maximum surface communication upon engagement.

Friction cone 32 provides rotation via drive gear 33, which in turn communicates with power takeoff, hydraulic motor, or other means of exterior power. Friction cone 32 in the exemplary embodiment utilizes a "ductaline" casting, which provides a more wear resistant material, while providing a more effective friction which will not jamb or lock up.

Figure 4:
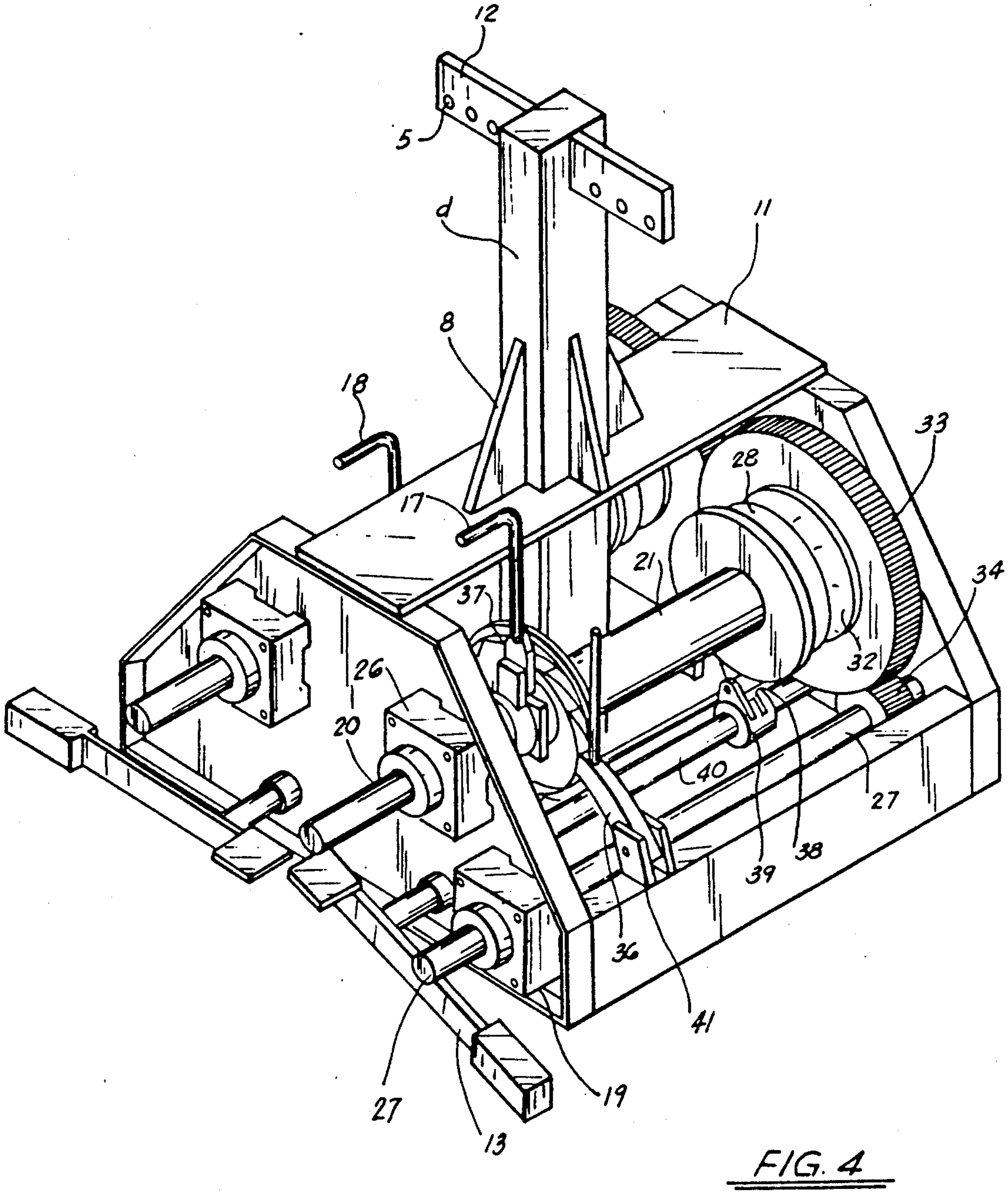
FIG. 4 is a side, perspective view of the two drum winch with dredge post embodiment of the present invention, illustrating the general layout of the device.

As may be best seen in FIG. 4, opposing drum well 28 is drum wall, which includes means for locking the drum in place via holding dog handle 36. Holding dog handle 36 locks drum wall 29 into place, preventing rotation via an interlocking arrangement in which holding dog handle 36 is lowered to drum wall 28 such that dog handle 36 is juxtaposed between drum well teeth 37.

Spring 25 provides resistance for keeping drum 21 in the unengaged position unless otherwise directed by handle 17. Handle 17 incorporates means for placing drum 21 in the engaged position. Spring 25 in the exemplary embodiment of the present invention is a high grade alloy spring manufactured by Inkalloy, providing superior specifications and life over conventional carbon steel springs as used in the prior art.

In order to provide increased wear and more effective lubrication, the present invention utilizes bronze wear plates 23, 31. Wear plate 23 is juxtaposed clutch 22 and drum well 29, while wear plate 31 is juxtaposed drive gear 33 and spring 25. The wear plates 23, 31 are comprised of brass or other material softer than the components to which they are juxtaposed to provide controlled means of wear, essentially cannibalizing the plates in lieu of the more expensive components which they protect, namely, drive gear 33, spring 25, drum well 29 and clutch 22. The wear plates of the exemplary embodiment are comprised of 660 bronze, in lieu of the softer yellow brass as taught in the prior art, providing superior wear characteristics while maintaining protection.

Figure 8A:
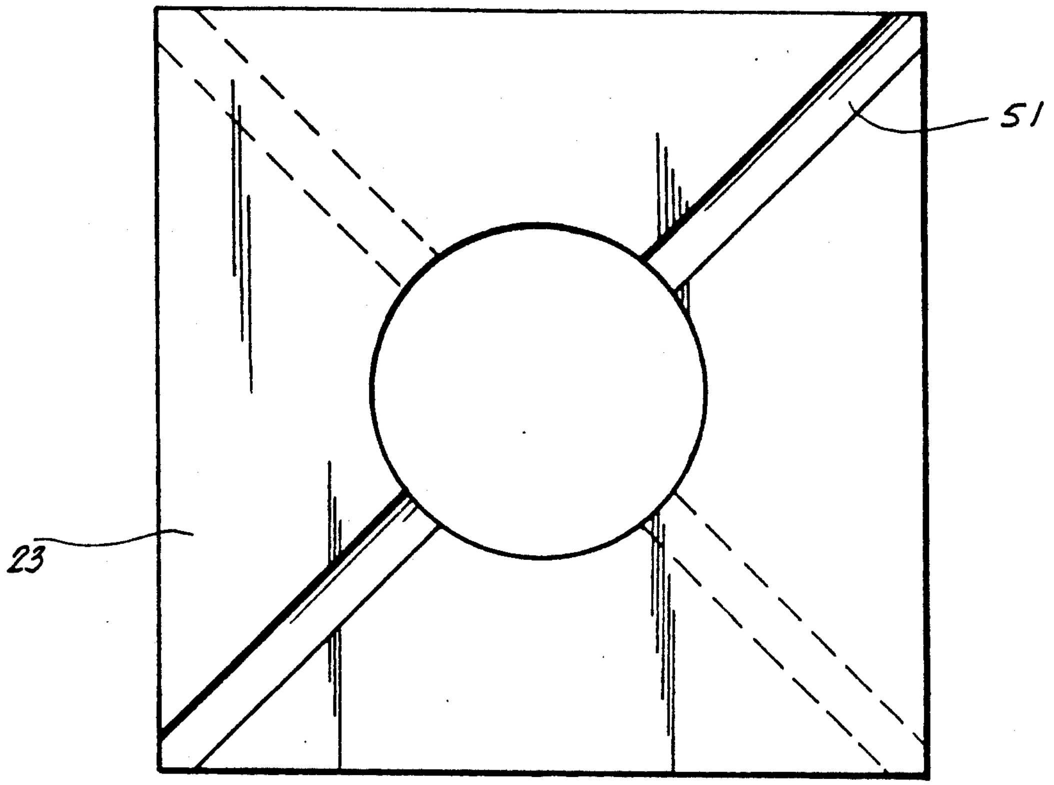
FIGS. 8A & B are top and side views of the wear plate element of the present invention, with some of the grooves being shown in phantom line.
Figure 8B:
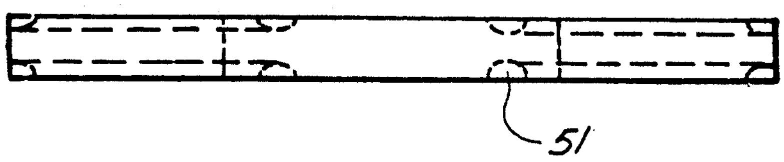
Figure 9A:
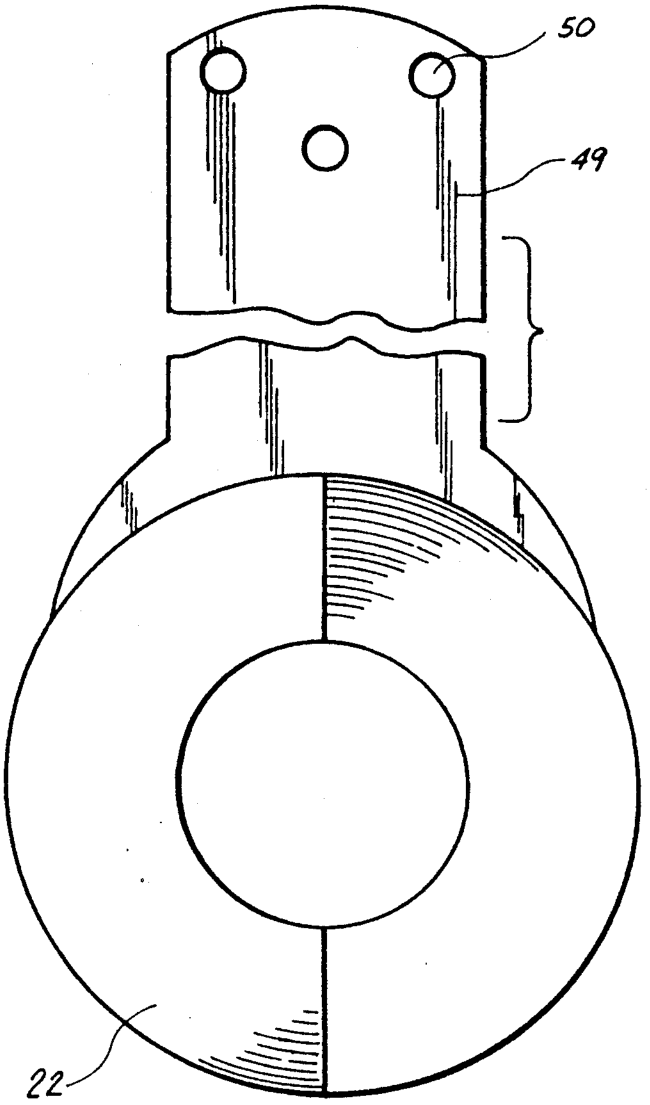
FIGS. 9A & B are side and top views of the handle clutch element of the present invention.
Figure 9B:
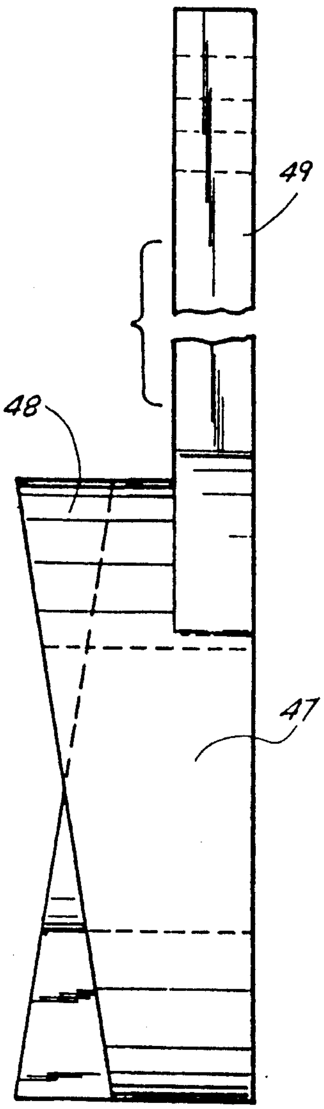

As may be seen in FIGS. 8A & B, wear plates 23, 31 are of a square configuration and incorporate "grease grooves" for providing continuous lubrication of the shaft of the winch. The grease grooves comprises indentations at forty-five degree angles running from the corners to the center of the wear plate. Each side includes one such groove, each being approximately, for example, one-sixteenth of an inch deep and one-quarter of an inch wide. As the winch turns, the square wear plate's movement causes the grease to circulate up the groove and onto the shaft.

Upper drum shaft 26 is held in place via shaft collar 20 exterior chassis 11. Cathead 10 may be implemented on an extended exterior portion of shaft 26 for winching ropes, lines and the like on a temporary basis.

For controlling the release of the oyster dredge, the present invention utilizes a band brake system incorporated exterior the drum well. Foot brake pedals 14 are connected to brake shaft 40, which runs horizontal through chassis 11 under upper drum shaft and juxtaposed lower gear shaft 27. At that point on brake shaft under drum well 28 lies brake band cleaves 39. Brake band cleaves 39 is frictionally connected to brake shaft 40 and pivotally connected to drum band 38, which in turn encircles the exterior of drum well 28.

When brake pedal 14 is pressed, the turning motion is communicated to cleaves 39 via shaft 40, tightening band 38 around well 28, causing friction, and thereby slowing the release of cable 7. An identical arrangement is provided for control of starboard drum 42 via brake system controlled by pedal 13.

For driving aft main gear 33, lower drive gear 34 is provided. Lower drive gear 34 is affixed to lower drive shaft 27, allowing rotation via shaft collar 19. The present system may be powered by a pneumatic drive system or a "power take-off" drive system affixed directly to either communicate with lower drive gear 34 or lower drive shaft 27. Either way, lower drive gear 34 communicates with main gear 33, providing rotational means for drum 21. A similar arrangement is provided for the starboard drum via shaft 45, ultimately communicating via lower drive gear 46 to main starboard drive gear 16.

Figure 7B:
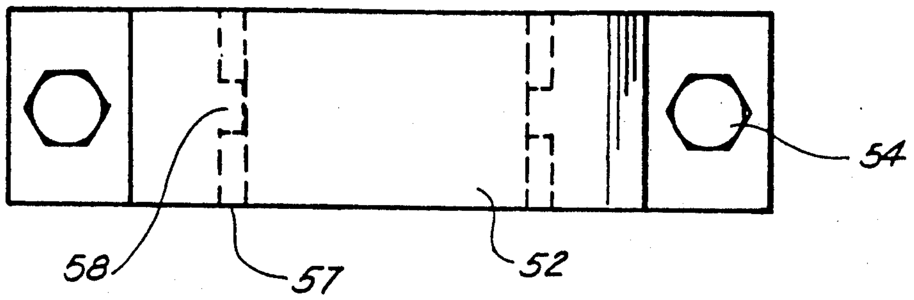
FIGS. 7A–B are top and side, cross-sectional views of the split collar element of the present invention.
Figure 7A:
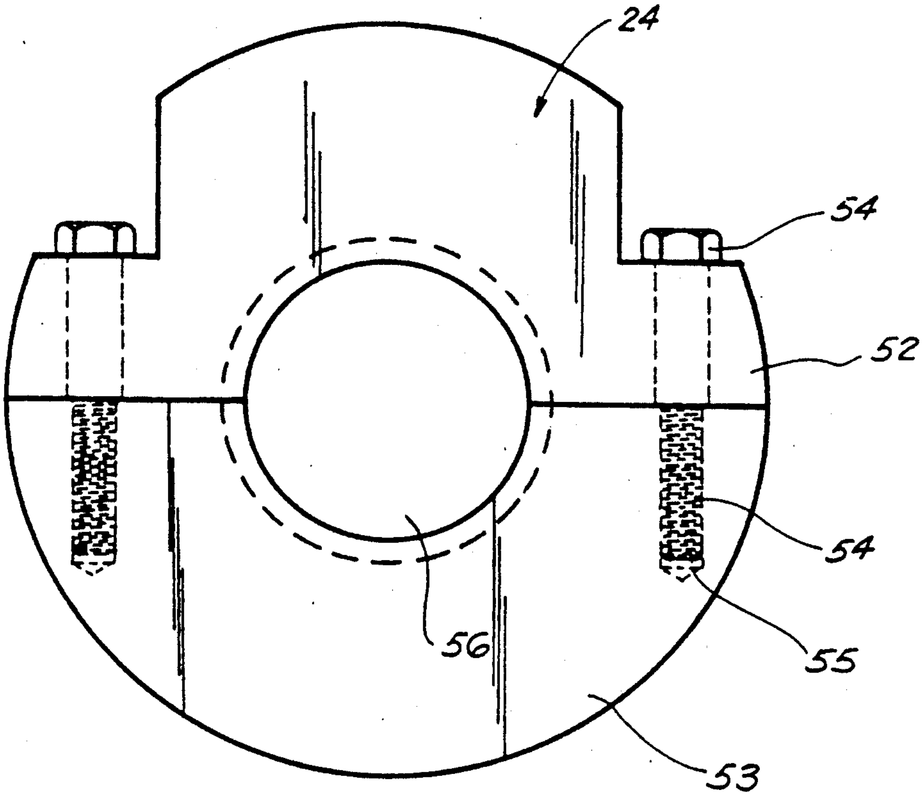

Juxtaposed drive gear 33 and chassis 11 is split collar 24. As may be seen in FIGS. 7A & B, the split collar 24 is configured in circular form with a central opening 56 through which the shaft 26 passes. Split collar 26 comprises two halves 52, 53 joined via bolt 54 and tap hole 55 configuration. In order to maintain a secure fit of the two halves, a slot 38 and groove 57, 58 arrangement is provided; the present arrangement is superior to prior art split collars, as it facilitates easier installation and maintenance.

Figure 5:
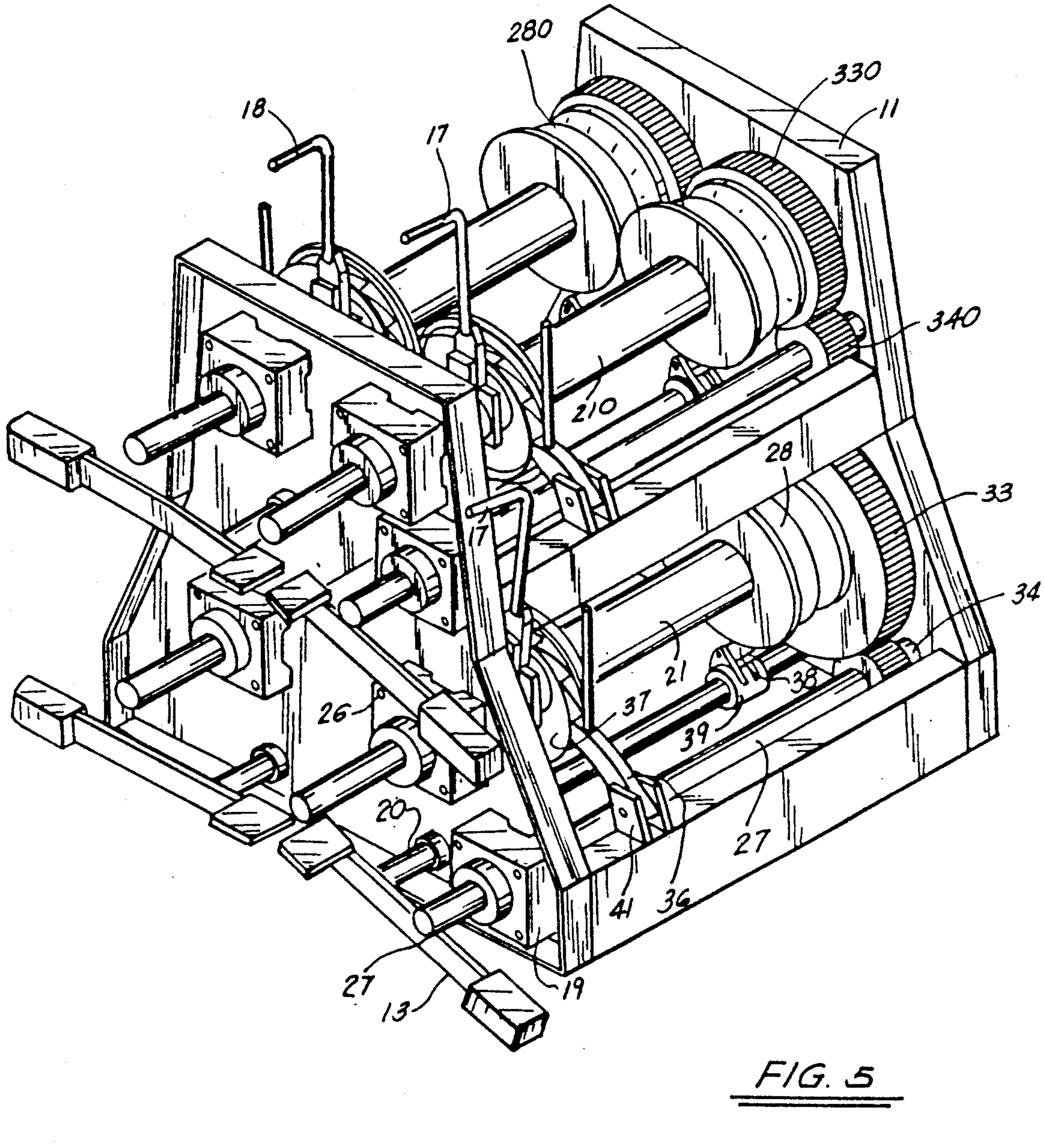
FIG. 5 is a side, perspective view of the four drum winch embodiment of the present invention.
Figure 6:
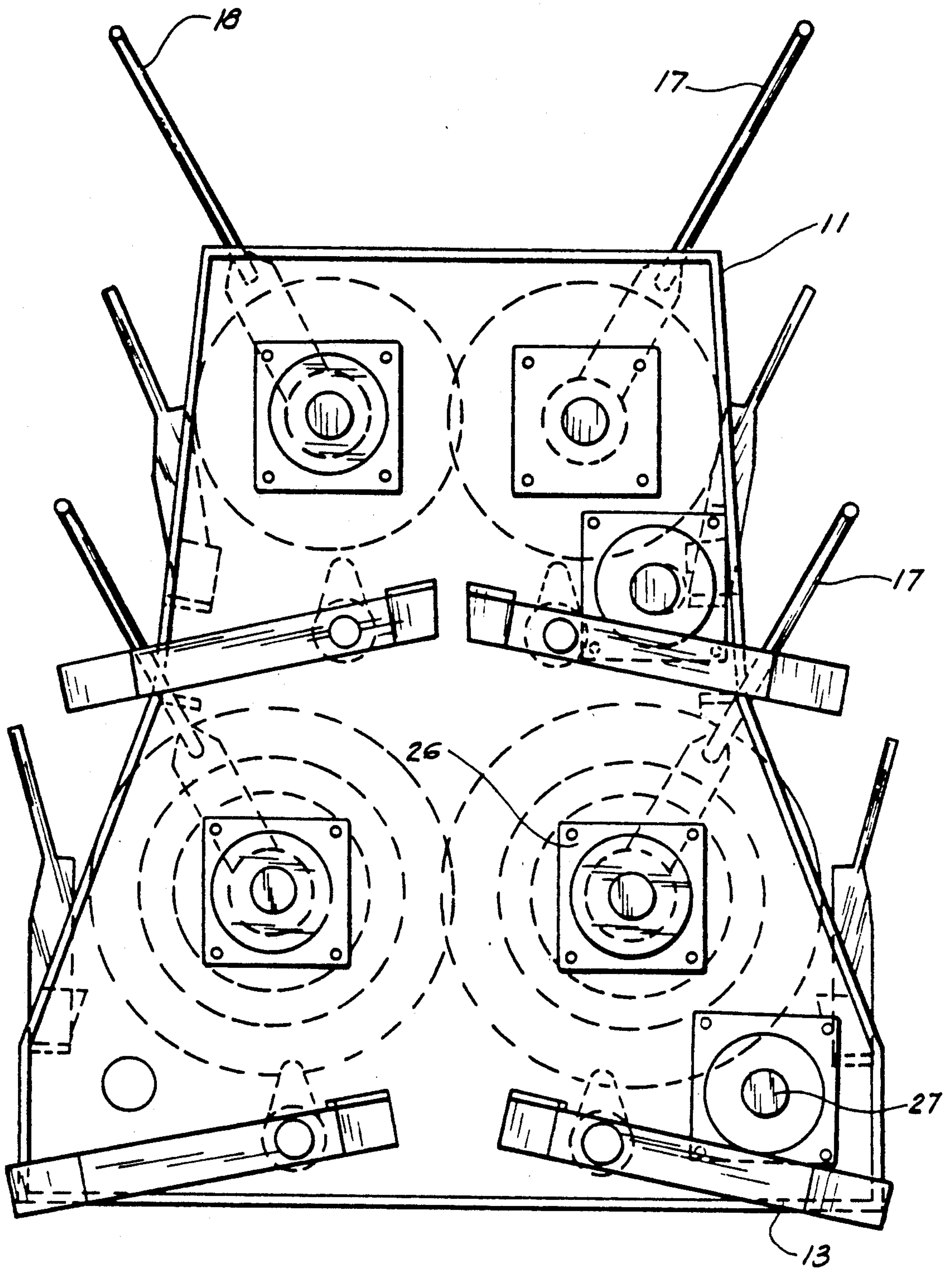
FIG. 6 is a side view of the four drum embodiment of the present invention with the drum elements shown in phantom line.

FIGS. 5 and 6 illustrate an alternative embodiment to the present invention, similar in operation to the two drum system, but utilizing four drums and not including a dredge post. The four drum system incorporates two upper drums 21U, 42U in similar fashion to lower drums 21, 42. Likewise, drive system 34U, 33U and brake system 28 are similarly configured. This embodiment would be particulary suitable for shrimping operations and the like, providing a compact yet sturdy and maintenance free system, easily controlled by a single person, yet providing all of the winching needs for a medium size shrimping vessel.

A similar embodiment is also contemplated utilizing the above four drum configuration, but also incorporating a fifth drum for the implementation of test nets and the like.

The embodiments described herein in detail for exemplary purposes are of course subject to many different variations in structure, design, application and methodology. Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. A winch device for use in conjunction with the dredging of oysters and the like, comprising:
   load bearing means, said means including a load bearing member flexible along its length such as rope, cable, chain or the like,
   spool means for spooling said load bearing means,
   shaft means for turning said spooling means,
   braking means for braking said spooling means,
   drive means for driving said shaft means,
   engagement means for engaging or disengaging said spooling means with said driving means,
   wear reduction means associated with said engagement means, said wear reduction means further comprising plates of metal juxtaposed said engagement means, said plates of metal comprised of material softer than said engagement means,
   frame means for framing said winching means, and
   support means for supporting and guiding said load bearing means over said spooling means, said support means including a vertical support member associated with said frame means.

2. The winch device of claim 1, wherein said load bearing means comprises a cable having ends A and B, with mounting hardware affixed on end A of said cable, said mounting hardware also affixed to said spooling means, and end B of said cable is affixed to an oyster dredge.

3. The winch device of claim 1, wherein said spooling means comprises at least one cable drum slidingly engaged to a shaft supported by said frame means.

4. The winch device of claim 1, wherein said braking means comprises a band braking mechanism.

5. The winch device of claim 1, wherein said wear reduction means comprises metal wear plates of 660 bronze.

6. The winch device of claim 5, wherein said wear reduction means further includes linear indentations incorporated into the surface of said metal wear plates, said linear indentations configured to circulate lubricants to said shaft means of said winch device.

7. A winch device for use in conjunction with the trawling of shrimp and the like, said device comprising:
   load bearing means, said means including a load bearing member flexible along its length such as rope, cable, chain or the like,
   spool means for spooling said load bearing means,
   shaft means for turning said spooling means,
   braking means for braking said spooling means,
   drive means for driving said shaft means,
   engagement means for engaging or disengaging said spooling means with said driving means,
   wear reduction means associated with said engagement means, said wear reduction means comprising plates of metal juxtaposed said engagement means, said plates of metal comprised of material softer than said engagement means, said wear reduction means also including linear indentations incorporated into the exterior of said plates of metal, said linear indentations configured to circulate lubricants to said shaft means of said winch device.
   frame means for framing said winching means, and
   support means for supporting and guiding said load bearing means over said spooling means, said support means including a vertical support member associated with said frame means.

8. The winch device of claim 7, wherein said load bearing means comprises a cable having ends A and B, with mounting hardware affixed on one end A of said cable, said mounting hardware also affixed to said spooling means, and end B of said cable is affixed to an oyster dredge.

9. The winch device of claim 7, wherein said spooling means comprises at least one cable drum slidingly engaged to a shaft supported by said frame means.

10. The winch device of claim 7, wherein said braking means comprises a band braking mechanism.

11. The winch device of claim 7, wherein said wear reduction means comprises metal wear plates of "660" bronze.

12. A method of winching an oyster dredge, said method comprising the following step(s):
   installing a winch device for use in conjunction with the dredging of oysters and the like on the deck of a vessel, said device including:
   load bearing means, said means including a load bearing member flexible along its length such as rope, cable, chain or the like,
   spool means for spooling said load bearing means,
   shaft means for turning said spooling means,
   braking means for braking said spooling means,
   drive means for driving said shaft means,
   engagement means for engaging or disengaging said spooling means with said driving means,
   wear reduction means associated with said engagement means, said wear reduction means comprising plates of metal juxtaposed said engagement means, said plates of metal comprised of material softer than said engagement means, said wear reduction means also including linear indentations incorporated into the exterior of said plates of metal, said linear indentations configures to circulate lubricants to said shaft means of said winch device.
   frame means for framing said winching means, and
   support means for supporting and guiding said load bearing means over said spooling means, said support means including a vertical support member associated with said frame means,
   connecting said load bearing means to an oyster dredge,
   lowering said oyster dredge into the water and onto said oyster beds via said support means and said spooling means in conjunction with said braking means, and
   lifting said oyster dredge from the sea bed via said load bearing means, said spooling means, and said engagement means.

* * * * *